United States Patent
Sachs et al.

(10) Patent No.: US 12,423,808 B2
(45) Date of Patent: Sep. 23, 2025

(54) SYSTEM AND METHOD FOR COMPARING SPECT AND PET IMAGE DATA IN THERANOSTICS

(71) Applicant: GE Precision Healthcare LLC, Wauwatosa, WI (US)

(72) Inventors: Jonathan Sachs, Haifa (IL); Raz Carmi, Haifa (IL)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 427 days.

(21) Appl. No.: 18/060,688

(22) Filed: Dec. 1, 2022

(65) Prior Publication Data

US 2024/0185415 A1  Jun. 6, 2024

(51) Int. Cl.
  *G06K 9/00* (2022.01)
  *G01T 1/02* (2006.01)
  (Continued)

(52) U.S. Cl.
  CPC .............. *G06T 7/0012* (2013.01); *G01T 1/02* (2013.01); *G06T 5/50* (2013.01); *G06V 10/761* (2022.01);
  (Continued)

(58) Field of Classification Search
  CPC ................ G06T 7/0012; G06T 5/50; G06T 2207/10104; G06T 2207/10108;
  (Continued)

(56) References Cited

U.S. PATENT DOCUMENTS 11,238,197 B1 * 2/2022 Douglas ............... G16H 20/40
2009/0258335 A1 * 10/2009 Marmaropoulos ...... A63H 3/28
  707/999.103

(Continued)

OTHER PUBLICATIONS

Barca et al, Expanding Theranostic Radiopharmaceuticals for Tumor Diagnosis and Therapy, Pharmaceuticals, Jan. 2022, pp. 1-20, vol. 15, iss.1, No. 13. DOI: 10.3390/ph15010013.

(Continued)

*Primary Examiner* — Atiba O Fitzpatrick
(74) *Attorney, Agent, or Firm* — Daugherty & Del Zoppo, Co. LPA

(57) ABSTRACT

A computing system includes computer readable medium and a processor. The computer readable medium includes a computer readable medium including a positron emission tomography (PET)-to-single photon emission tomography (SPECT) module with instructions for generating simulated SPECT image data based on first PET image data. The PET image data is acquired prior to a treatment course of a treatment regimen with a SPECT-based treatment/imaging radiopharmaceutical. The processor is configured to obtain the first PET image data, system parameters of a SPECT-CT imaging system utilized to generate corresponding SPECT image data for the treatment regimen and scan parameters utilized by the SPECT-CT imaging system to acquire the corresponding SPECT image data. The processor is further configured to execute the instructions to generate the simulated SPECT image data based on the PET image data and the system parameters and the scan parameters.

20 Claims, 7 Drawing Sheets

(51) Int. Cl.
  *G06T 5/50* (2006.01)
  *G06T 7/00* (2017.01)
  *G06V 10/74* (2022.01)

(52) U.S. Cl.
  CPC .............. *G06T 2207/10104* (2013.01); *G06T 2207/10108* (2013.01); *G06T 2207/20221* (2013.01)

(58) Field of Classification Search
  CPC ......... G06T 2207/20221; G06T 11/005; G01T 1/02; G06V 10/761; G01V 2210/46; G01V 1/32; G01V 1/325; G01V 2210/244
  See application file for complete search history.

(56) References Cited

U.S. PATENT DOCUMENTS

2014/0072194 A1* 3/2014 Hansis ................. G06T 7/0012
  382/128
2014/0226883 A1* 8/2014 Hong .................... G06T 11/005
  382/130
2024/0366962 A1* 11/2024 Sjolund ................. G16H 50/70

OTHER PUBLICATIONS

Gains et al., 117 Lu-Dotatate Molecular Radiotherapy for Childhood Neuroblastoma, The Journal of Nuclear Medicine, Jul. 2011, pp. 1041-1047, vol. 52, No. 7. DOI: 10.2967/jnumed.110.085100.

Weineisen et al., 68Ga- and 177Lu-Labeled PSMA I&T: Optimization of a PSMA-Targeted Theranostic Concept and First Proof-of-Concept Human Studies, The Journal of Nuclear Medicine, Aug. 2015, pp. 1169-1176, vol. 56, No. 8. DOI: 10.2967/jnumed.115.158550.

Okamoto et al. Radiation dosimetry for 177Lu-PSMA-I&T in metastatic castration-resistant prostate cancer: Absorbed dose in normal organs and tumor lesions, Journal of Nuclear Medicine, 28 sheets, Sep. 22, 2016. DOI:10.2967/jnumed.116.178483.

* cited by examiner

SYSTEM AND METHOD FOR COMPARING SPECT AND PET IMAGE DATA IN THERANOSTICS

FIELD

The following generally relates to imaging processing and more particularly to comparing single photon emission computed tomography (SPECT) image data and positron emission (PET) image data, is described with particular application to theranostics, and is amenable to other applications.

BACKGROUND

Theranostics combines using a PET-based radiopharmaceutical to identify a primary tumor and a metastasize(s) or primary lesion and secondary lesion(s) and a SPECT-based radiopharmaceutical to deliver therapy to treat thereto. Both radiopharmaceuticals include a similarly or same cell-targeting molecule, but the PET-based radiopharmaceutical includes an imaging isotope, whereas the SPECT-based radiopharmaceutical includes a treatment/imaging isotope. PET imaging has greater sensitivity and resolution relative to SPECT imaging. As such, the PET image data may include smaller tumors not visible in the SPECT image data.

A theranostic procedure may begin with intravenously administering the PET-based radiopharmaceutical to a patient and performing a PET scan. The PET image data contains a biodistribution of the PET-based radiopharmaceutical and is utilized to determine whether there is uptake of the cell-targeting molecule and, where there is uptake, a location of the main tumor and the metastatic tumor(s). The PET image data can be used to determine whether to move forward with a treatment and provides baseline information that can be used to optimize overall treatment radiation dose and evaluate the treatment.

A treatment consists of administration of several courses of the SPECT-based radiopharmaceutical based on a treatment regimen. For a course, the SPECT-based radiopharmaceutical is administered to the patient, and one or more SPECT scans are performed over a period of time such as from a few hours to a few days after administration of the SPECT-based radiopharmaceutical. The SPECT image data contains a biodistribution of the SPECT-based radiopharmaceutical in tissue and can be used to assess uptake of the SPECT-based radiopharmaceutical.

The SPECT image data can be used to determine a time activity curve (TAC), which can be used to estimate a radiation dose given to various tissue such as tissue and organs (e.g., a dose-limiting organ) based on a dosimetry protocol. Subsequent treatment courses follow based on the treatment regimen, and the SPECT image data for each treatment course can be similarly utilized and/or compared with SPECT image data from one or more previous treatment courses to determine a response to the treatment, e.g., whether the tumors are decreasing in size, etc.

Such information has been used to assess an estimated efficacy of the treatment regimen and/or determine whether to continue, adjust or terminate a treatment regimen. For example, if uptake is lower than expected, the administered radiation dose for a subsequent treatment course can be increased. In another example, if uptake is higher than expected, the administered radiation dose for subsequent treatment courses can be decreased. In another example, if the dosimetry radiation dose value for a dose-limiting organ exceeds a predetermined threshold/maximum radiation dose, the treatment regimen can be terminated.

At the end of the treatment regimen, a PET scan is performed. The PET image data is compared with the initial PET image data to determine an overall effectiveness of the treatment regimen such as whether any of the main tumor and the metastatic tumor(s) have decreased in size and/or is no longer visible in the PET image data. This information has been utilized to determine whether the patient should undergo another treatment regimen. One or more PET scans can also be performed during the treatment regimen with the resulting PET image data compared with the initial or end PET image data.

The PET image data and the SPECT image can be compared; however, a result of the comparison may not accurately reflect a current state of the disease being treated and/or the treatment, at least due to inherent differences in the PET and SPECT imaging systems, including sensitivity, spatial resolution, energy resolution, etc. For example, a smaller metastasize or secondary tumor visible in the PET image data may not be visible in the SPECT image data. In another example, the uptake in the SPECT image data may be less than an expected uptake based on the uptake in the PET image data. Unfortunately, such differences may be erroneously interpreted as a difference in the biodistribution of the PET and SPECT-based radiopharmaceuticals.

In view of at least the foregoing, there is an unresolved need for another approach(s) for comparing PET and SPECT image data, at least in connection with theranostics.

SUMMARY

Aspects of the application address the above matters, and others.

In one aspect, a computing system includes computer readable medium and a processor. The computer readable medium includes a computer readable medium including a positron emission tomography (PET)-to-single photon emission tomography (SPECT) module with instructions for generating simulated SPECT image data based on first PET image data. The PET image data is acquired prior to a treatment course of a treatment regimen with a SPECT-based treatment/imaging radiopharmaceutical. The processor is configured to obtain the first PET image data, system parameters of a SPECT-CT imaging system utilized to generate corresponding SPECT image data for the treatment regimen and scan parameters utilized by the SPECT-CT imaging system to acquire the corresponding SPECT image data. The processor is further configured to execute the instructions to generate the simulated SPECT image data based on the PET image data and the system parameters and the scan parameters.

In another aspect, a computer-implemented method includes obtaining first PET image data that was acquired prior to a treatment course of a treatment regimen with a SPECT-based treatment/imaging radiopharmaceutical. The computer-implemented method further includes obtaining system parameters of a SPECT-CT imaging system utilized to acquire SPECT image data for the treatment regimen and scan parameters utilized by the SPECT-CT imaging system to acquire the SPECT image data. The computer-implemented method further includes generating a simulated SPECT image data based on the PET image data and the system parameters and the scan parameters.

In another aspect, a computer readable medium is encoded with computer executable instructions which when executed by a processor cause the processor to: obtain first PET image data that was acquired prior to a treatment course of a treatment regimen with a SPECT-based treatment/imaging radiopharmaceutical, obtain system parameters of a SPECT-CT imaging system to be utilized to acquire SPECT image data and scan parameters utilized by the SPECT-CT imaging system to acquire the SPECT image data, and generate a simulated SPECT image data based on the PET image data, the system parameters and the scan parameters.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings in which like references indicate similar elements.

DETAILED DESCRIPTION

A comparison of SPECT and PET image data may be beneficial in theranostics. However, such a comparison may be difficult at least due to the inherent differences in SPECT and PET imaging systems such as sensitivity, spatial resolution, energy resolution, which may be erroneously interpreted as a difference in a biodistribution of a SPECT-based radiopharmaceutical and the PET-based radiopharmaceutical. Examples of radiopharmaceuticals include SPECT radiopharmaceuticals Lutetium-177, Lutetium-177 dotatate, Lutetium-177 PSMA, iodine-131, etc., and PET radiopharmaceuticals Gallium-68, Gallium-68 dotatate, Gallium-68 PSMA, carbon-11, fluorine-18, etc. The comparison may include comparing primary tissue of interest (a tumor or lesion) and secondary tissue of interest (a secondary tumor(s)/metastasize(s) or a secondary lesion(s)) for treatment effectiveness.

Described herein is an approach(s) to enable a more accurate comparison by generating, from PET image data, simulated SPECT image data that will depict SPECT image data with a SPECT radiopharmaceutical with a substantially similar or a same biodistribution as the PET radiopharmaceutical in the PET image data. In one instance, the simulated SPECT image data mitigates effects of the inherent differences in the SPECT and PET imaging systems. The simulated SPECT image data can be visually compared with actual SPECT image data. In some instances, PET image data is calibrated based on SPECT image data, which may improve an accuracy of a quantitative comparison.

Figure 1:
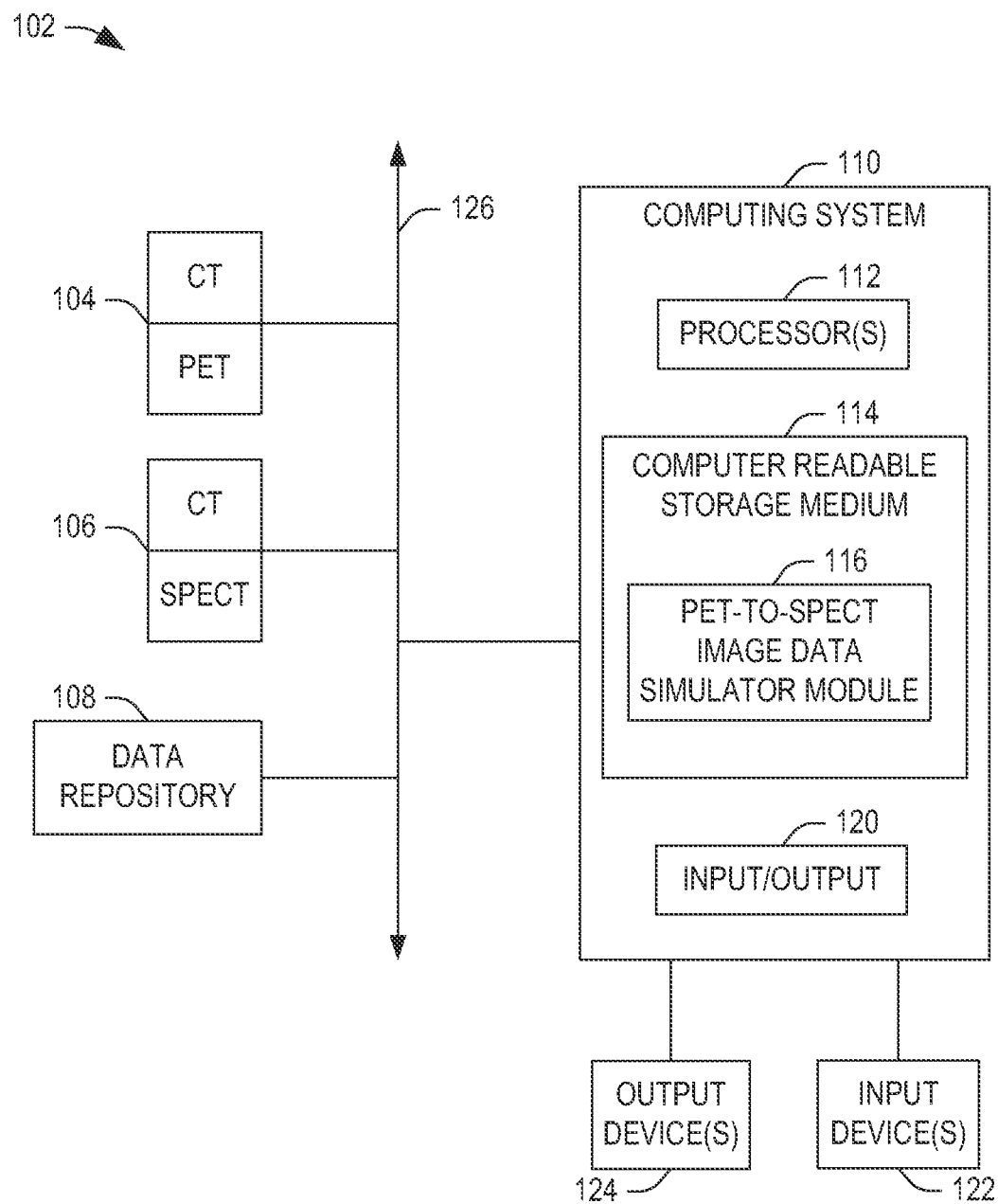
FIG. 1 schematically illustrates a non-limiting example of a system that includes a PET-to-SPECT image data simulator module, in accordance with an aspect of an embodiment(s) herein.

FIG. 1 schematically illustrates a non-limiting example of a system 102. The system 102 includes a combination positron emission tomography and computed tomography (PET-CT) imaging system 104 and a combination single photon emission computed tomography and computed tomography (SPECT-CT) imaging system 106. Briefly turning to FIGS. 2, 3 and 4, non-limiting examples of CT, PET and SPECT systems 202, 302 and 402 are illustrated. The portions 202, 302 and 402 are illustrated separately for clarity and sake of explanation, however, each of the PET-CT imaging system 104 and the SPECT-CT imaging system 106 can include certain systems of the individual systems or be an integrated combined system.

Figure 2:
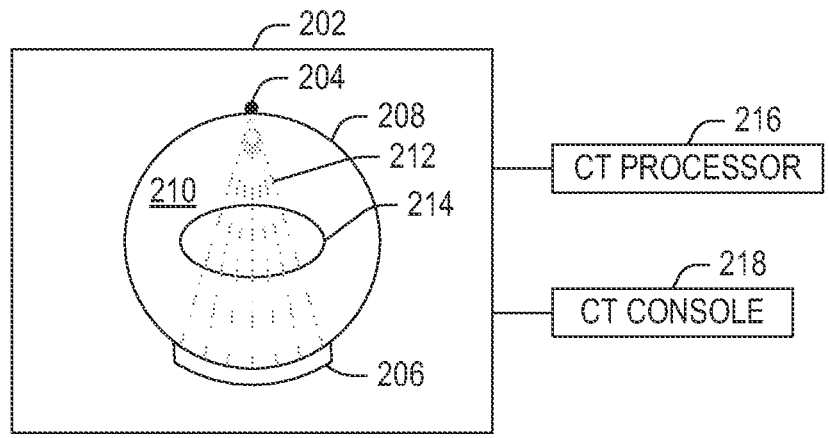
FIG. 2 schematically illustrates a non-limiting example of a CT system, in accordance with an aspect of an embodiment(s) herein.

Beginning with FIG. 2, the CT imaging system 202 includes an X-ray source 204 and an array of X-ray radiation detectors 206 disposed on a rotating frame 208, opposite each other, across a CT examination region 210. The rotating frame 208 rotates the X-ray source 204 in coordination with the array of X-ray radiation detectors 206. The X-ray source 204 emits X-ray radiation 212 that traverses the examination region 208 and a subject 214 disposed therein, and the array of X-ray radiation detectors 206 detects X-ray radiation impingent thereon. For each arc segment, the array of X-ray radiation detectors 206 generate a view of projections. A CT processor 216 reconstructs the acquired data, generating a CT image data. A CT console 218 allows a user to control the CT imaging system 202. Although a single CT configuration is discussed, the configuration of the CT portion of the PET-CT and the SPECT-CT imaging systems 104 and 106 may be different.

Figure 3:
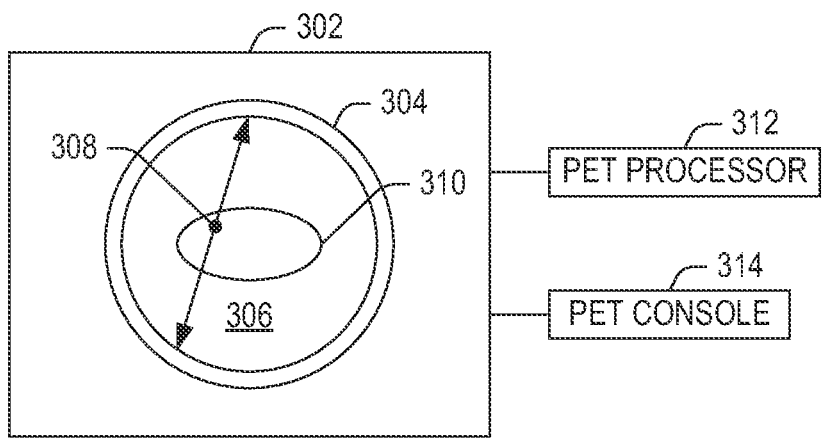
FIG. 3 schematically illustrates a non-limiting example of a PET system, in accordance with an aspect of an embodiment(s) herein.

Moving to FIG. 3, the PET imaging system 302 includes one or more rings of gamma radiation detectors 304 arranged around a PET examination region 306. The detector ring 304 detects 511 keV gamma rays produced in response to a positron annihilations event 308 occurring in a subject 310 in the examination region 306. A PET processor 310 identifies coincident gamma pairs by identifying photons detected in temporal coincidence (or near simultaneously) along a line of response (LOR) and generates event by event or list mode data indicative thereof. The data may also include time-of-flight (TOF) information, which allows the location of an event along a LOR to be estimated. The PET processor 312 reconstructs acquired data, generating a PET image data. A PET console 314 allows a user to control the PET scanner 302. The PET image data and the CT image data from the PET-CT imaging system 104 can be co-registered, and the CT image data is utilized to generate an attenuation map for attenuation correction of the PET image data.

Figure 4:
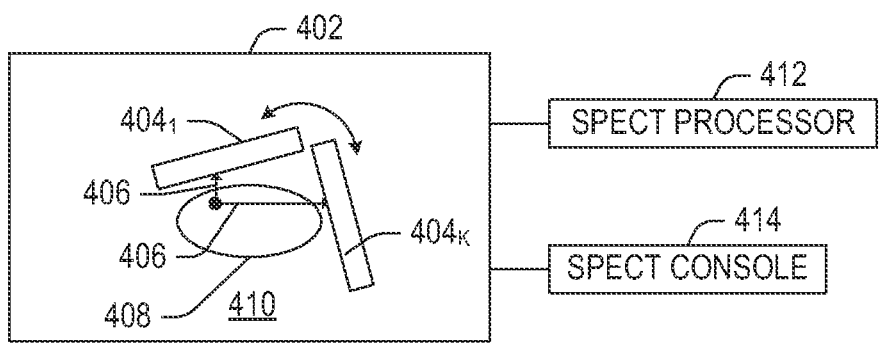
FIG. 4 schematically illustrates a non-limiting example of a SPECT system, in accordance with an aspect of an embodiment(s) herein.

Moving to FIG. 4, the SPECT imaging system 402 includes k gamma radiation detectors $404_1, \ldots, 404_k$, where k is an integer equal to or greater than one (two are shown for sake of explanation). The gamma radiation detectors $404_1, \ldots, 404_k$ detect gamma rays 406 emitted from a subject 408 in a SPECT examination region 410 and having energy in the treatment energy range. The gamma radiation detectors 4041, ..., 404x acquire projections from a number of angles with respect to the examination region 410, e.g., by rotating the gamma radiation detectors 4041, ..., 404x around the examination region 410. A SPECT processor 412 reconstructs the acquired data, generating a SPECT image data. A SPECT console 414 allows a user to control the SPECT scanner 402. The SPECT image data and the CT image data from the SPECT-CT imaging system 106 can be co-registered.

Returning to FIG. 1, the system 102 further includes a data repository 108. Non-limiting examples of the data repository 108 include a cloud-based storage resource, a server, a workstation, a distributed network, a Radiology Information System (RIS), Hospital Information System (HIS), an electronic medical record (EMR), a PACS, and/or other computing and/or archival system. In one instance(s), the data repository 108 is part of the PET-CT imaging system 104, the SPECT-CT imaging system 106 and/or other imaging system.

The system 102 further includes a computing system 110, such as a computer, a workstation, a PACS, and/or other computing apparatus. The computing system 110 includes a processor(s) 112 and computer readable storage medium 114. Non-limiting examples of the processor(s) 112 include a central processing unit (CPU), a microprocessor (μP), graphics processing unit (GPU), and/or other processor. The computer readable storage medium 114 includes non-transitory storage medium such as physical memory, a memory device, etc., and excludes transitory medium. The processor(s) 112 is configured to execute at least one computer readable instruction encoded or embedded in the computer readable storage medium 114, which causes the processor 112 to perform functions described herein and/or another function(s).

The computer readable storage medium 114 includes a PET-to-SPECT image data simulator module 116 with computer readable and/or executable instructions to generate simulated SPECT image data from PET image data for theranostics procedures where the imaging isotope of the PET-based radiopharmaceutical and the treatment isotope of the SPECT-based radiopharmaceutical are attached to a similar or same cell-targeting molecule. As described in greater detail below, in one instance, the PET-to-SPECT image data simulator module 116 generates and outputs one or more sets of simulated SPECT image data having a substantially similar or a same biodistribution as a PET-based radiopharmaceutical as the input PET image data used to generate the simulated SPECT image data.

In one instance, this allows for a more accurate comparison of PET image data acquired before, during and/or after treatment and SPECT image data acquired during the treatment, regardless of inherent differences (e.g., sensitivity, spatial resolution, energy resolution, etc.) between the PET-CT imaging system 104 and the SPECT-CT imaging system 106, mitigating erroneously interpretating differences as differences in the biodistribution of the PET and SPECT-based radiopharmaceuticals. This also allows for comparing simulated SPECT image data, facilitating follow up analysis, facilitating on-going analysis, performing retrospective analysis including assessing treatment efficacy, e.g., overall effectiveness of a treatment regimen, research, development of new radiopharmaceuticals, etc.

The computing system 110 further includes input/output (I/O) 120. An input device(s) 118, such as a keyboard, a mouse, a touchscreen, a microphone, etc., is in electrical communication with the computing system 110 via the I/O 116 and/or otherwise. The input device(s) 122 provides signals indicative of user input. An output device(s) 124, such as a display monitor, a speaker, etc., is also in electrical communication with the computing system 110 via the I/O 120 and/or otherwise. The PET image data, the SPECT image data, and/or the simulated SPECT image data can be visually presented via a display monitor of the output device(s) 124.

The system 102 further includes a network 126. The computing system 110 is in operative communication with the PET-CT imaging system 104, the SPECT-CT imaging system 106, and/or the data repository 108 via the network 126 through wire and/or wireless technologies. In one instance, the PET-CT imaging system 104 and/or the SPECT-CT imaging system 106 are in operative communication with the data repository 108 over the network 126. The PET image data, the SPECT image data, and/or the simulated SPECT image data can be transferred over the network 126 via the Digital Imaging and Communications in Medicine (DICOM) protocol and/or other protocol.

Figure 5:
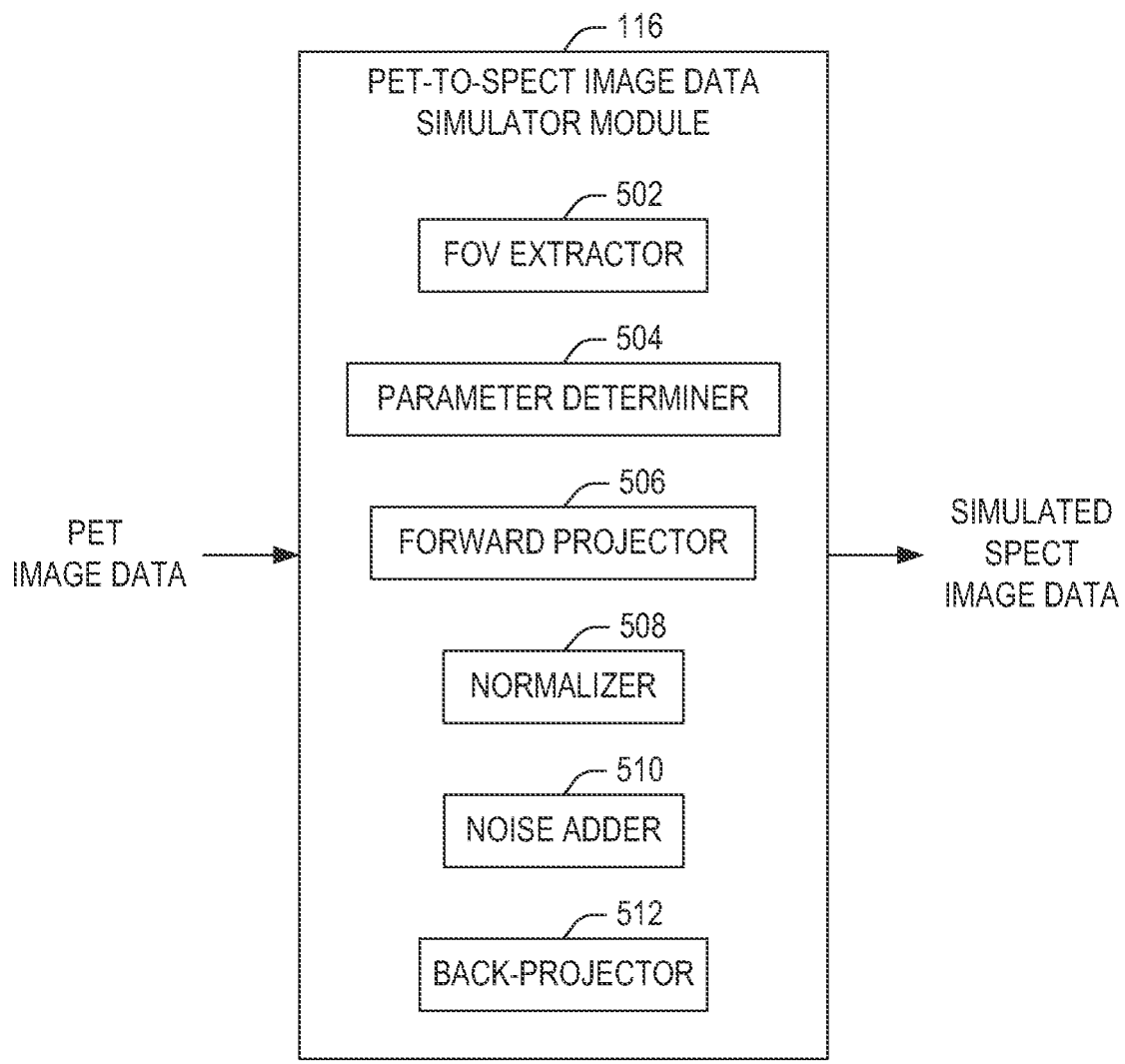
FIG. 5 schematically illustrates a non-limiting example of the PET-to-SPECT image data simulator module, in accordance with an aspect of an embodiment(s) herein.

Turning to FIG. 5, a non-limiting example of the PET-to-SPECT image data simulator module 116 of FIG. 1 is schematically illustrated. The PET-to-SPECT image data simulator module 116 receives, as input, PET image data. The PET image data is received and/or retrieved from the PET-CT imaging system 104, the data repository 108, and/or other device.

The PET-to-SPECT image data simulator module 116 includes a field of view (FOV) extractor 502. The FOV extractor 502 extracts a SPECT FOV from the input PET image data. The PET-to-SPECT image data simulator module 116 further includes a parameter determiner 504. The parameter determiner 504 determines SPECT system parameters and SPECT scan parameters such as detector radius, detector sweep, collimator, etc. parameters from a DICOM field of the SPECT image data file and/or otherwise. The SPECT system parameters and SPECT scan parameters correspond to the SPECT-CT imaging system 106 and scan protocol used for the theranostics procedure.

The PET-to-SPECT image data simulator module 116 further includes a forward projector 506. The forward projector 506 forward projects the PET image data into SPECT projections based on a geometry of the SPECT-CT imaging system 106 via the extracted parameters. In one instance, the forward projector 506 forward projects the PET image data based on $A_{ji}*v_i=p_j$, where A is a probability of photons with an energy distribution of the SPECT-based radiopharmaceutical in voxel $v_i$ being detected by a detector pixel $p_j$, where $j=1 \ldots M$, and can be computed based $A=u*\Sigma(r_e*S_{ed}*S_{eg}*T_e)$, where u represents a view duration used to normalize each set of pixels in a view, $r_e$ represents a percent of photons with an energy of e. $S_{ed}$ represents a detector sensitivity, $S_{eg}$ represents a geometric sensitivity, and $T_e$ represents the attenuation. In some instance, A may also include modeling of septal penetration.

For this, a position of the pixel $p_j$ is at a plane of the photon detection, or depth of interaction. As the SPECT portion of the SPECT-CT imaging system 106 includes k detectors 402, each detector moving dependently or independently, a number of pixels is $M=>\Sigma(N_k*S_k)$, where $N_k$ is a number of pixels in detector k, and $S_k$ is a number of orientations detector k was positioned during the acquisition, and there are $\Sigma S_k$ views. The detector sensitivity $S_d$ is predetermined and depends on a detector material, electronics, etc. of the SPECT-CT imaging system 106 and an energy of the photon to be detected. The geometric sensitivity Sg can be determined as a ratio of a solid angle of an unobstructed projection of a point (or a mean of several points) in a voxel onto a detector pixel divided by 4π, and depends on the collimator, alignment of collimator and pixel, and the position of voxel.

The attenuation map T is derived from a corresponding CT scan of the patient with the CT portion of the SPEC-CT imaging system 106. In general, for each voxel $v_i$ there will be a voxel ti with a linear attenuation coefficient (in units of inverse centimeters, or $cm^{-1}$) of a material in the voxel as estimated from the CT scan. The attenuation T is an exponent of a negative of a line integral of the attenuation map voxels multiplied by voxel size (cm). The line is a line connecting a voxel to a detector pixel. The value of T represents the probability of a photon being transmitted along the line between the voxel and the detector pixel without being scattered or absorbed. Photon scattering can be modeled via a convolution projection algorithm or by utilizing a fast Monte Carlo algorithm.

The PET-to-SPECT image data simulator module 116 further includes a normalizer 508. The normalizer 508 normalizes the simulated SPECT projections of the FOV to the acquired SPECT projection. Various methods may be applied to normalization simulated projections of the SPECT field of view to the acquired SPECT projection. In one instance, the simulated projections are normalized to a same number of total counts as acquired in the SPECT acquisition. In another instance, the pixels are sorted by ascending values, and pixels below an nth percentile, e.g., 80%, are identified and normalized. In another instance, the simulated pixels are normalized to bring a difference between the simulated and acquired pixels close to zero (0), based on an assumption that if the difference is primarily due to noise it will be close to zero.

The PET-to-SPECT image data simulator module 116 further includes a noise adder 510. The noise adder 510 adds noise to the normalized simulated projections. In general, the normalized simulated SPECT projections are free of SPECT noise, and noise adder 510 adds Poisson (SPECT) noise to the normalized simulated projections. The PET-to-SPECT image data simulator module 116 further includes a back projector 512. The back-projector 512 reconstructs the projections to generate the simulated SPECT image data. This process can be repeated for multiple SPECT FOVs, and the results can be combined into a single image data set. The PET image data, the SPECT image data, and/or the simulated SPECT image data can be visually presented.

Figure 6:
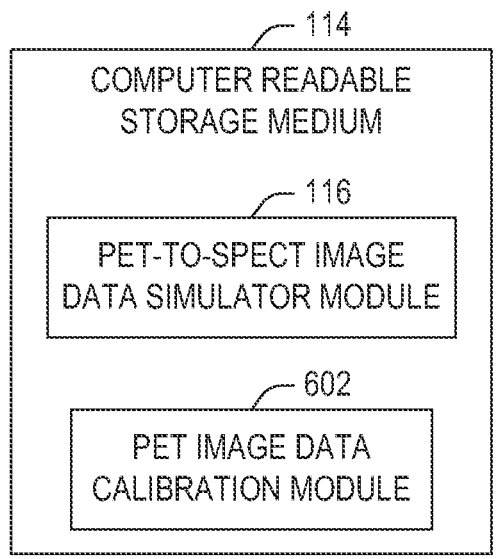
FIG. 6 schematically illustrates a variation of the system that includes a PET image data calibration module, in accordance with an aspect of an embodiment(s) herein.
Figure 7:
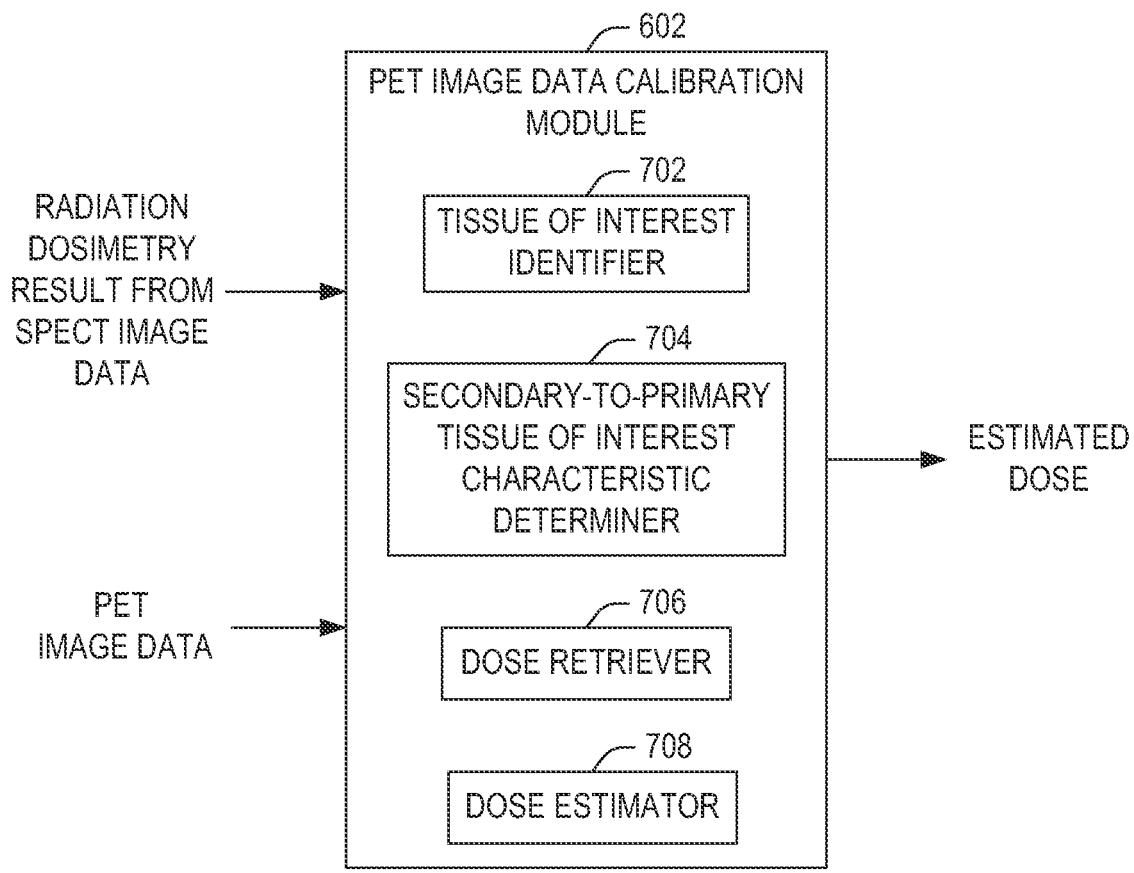
FIG. 7 schematically illustrates a non-limiting example of the PET image data calibration module, in accordance with an aspect of an embodiment(s) herein.

FIG. 6 schematically illustrates a variation in which the computer readable storage medium 114 further include a PET image data calibration module 602. The PET image data calibration module 602 calibrates the PET image data based on the SPECT image data so that the PET image data includes dosimetry information of a metastasize(s) or secondary lesion(s) visible in the PET image data, but not visible in the SPECT image data. FIG. 7 schematically illustrates a non-limiting example of the PET image data calibration module 602.

The PET image data calibration module 602 receives, as input, radiation dosimetry results for the SPECT image data acquired after a course of treatment with the SPECT-CT imaging system 106. The radiation dosimetry results include at least a dosimetry value for a primary tumor or lesion of a disease of interest being treated by the SPECT-based imaging/treatment radiopharmaceutical. The radiation dosimetry result quantifies, in standard radiation units, an absorbed dose in selected organs as a function of the overall administered (injected) dose.

The PET image data calibration module 602 further receives, as input, PET image data acquired after administration of the PET based imaging radiopharmaceutical and before or after the SPECT scan. The PET image data accurately depicts the primary tumor and a metastasize(s) or primary lesion and secondary lesion(s). In one instance, the PET image data is scaled in standard uptake value (SUV) units and not in standard radiation units. Generally, it is not readily straightforward to translate SUV values to standard radiation dose, e.g., since different factors can be involved.

The PET image data calibration module 602 includes a tissue of interest identifier 702. The tissue of interest identifier 702 identifies in the PET image data a primary tumor or lesion of a disease of interest(s) being treated by the SPECT-based imaging/treatment radiopharmaceutical and one or more metastasizes or secondary tumors related to the disease of interest being treated. In one instance, this includes metastasizes or secondary tumors visible in the PET image data and not visible in the SPECT image data. In one instance, this can be performed automatically or semi-automatically using segmentation and structure recognition software application. Alternatively, or additionally, this can be performed manually through input from a user using manual image segmentation tools.

The PET image data calibration module 602 further includes a secondary-to-primary tissue of interest characteristic determiner 704. The secondary-to-primary tissue of interest characteristic determiner 704 determines a relationship value indicative of a relationship between the one or more metastasizes and the primary tumor or the one or more metastasizes secondary lesions and the primary lesion in the PET image data. A non-limiting example of such a relationship includes a ratio between a maximum value or mean values of radiopharmaceutical uptake in a selected region(s), where the maximum value can be defined, e.g., as a mean value of a highest ten percent (10%) of voxel values of a selected image region.

The PET image data calibration module 602 further includes a dose retriever 706. The dose retriever 706 obtains a radiation dose value for an actual administered dose. In one instance, the radiation dose value corresponds to a total radiation dose for a healthy tissue such as the dose limiting tissue and/or other tissue based on dosimetry results for the treatment course.

The PET image data calibration module 602 further includes a dose estimator 708. The dose estimator 708 is configured to estimate one or more dose values respectively for the one or more metastasizes or the one or more secondary lesions, e.g., based on the dosimetry value of the primary tumor, the relationship value between the one or more metastasizes and the primary tumor or the one or more metastasizes secondary lesions and the primary lesion, and the radiation dose value for an actual administered dose.

In one instance, the dose estimator 708 is configured to estimate a dose value based Ds=Rsp*Dp*(At/Ad), where Ds represents a dose absorbed by a metastasize or secondary lesion, Rsp represents a ratio between the metastasize and the primary tumor or secondary lesion and primary lesion, Dp represents a measured dose absorbed by the primary tumor or the primary lesion during the dosimetry protocol, At represents an actual administered dose in a treatment course(s), and Ad represents an actual administered dose in the dosimetry protocol.

The PET image data calibration module 602 outputs the one or more dosimetry values for the one or more metastasizes. For example, the results can be visually displayed, via the output device(s) 124, as an analysis summary of the estimated radiation dose absorbed by the primary tumor and metastasize(s) or the primary lesion and secondary lesion(s) during a treatment course(s). The calculated doses may also be visually superimposed over the displayed PET-CT image data.

Providing such information can improve an accuracy of a quantitative comparison between the SPECT image data and the simulated SPECT image data derived from the PET image data. In addition, the results may assist individual treatment management and/or assessment, and/or therapy efficacy research.

Since PET- and SPECT-based radiopharmaceuticals include the same or a very similar biological molecule, the image data can be directly compared assuming that the biodistribution and physiological uptake in different tissues will be similar in nature, both for disease and healthy tissues and organs. However, some differences may exist.

For example, the cell-targeting molecule component of the radiopharmaceuticals can be different, e.g., due to chemical modifications used to attach the isotopes. In addition, differences in the isotopes themselves may affect the biodistribution and bio-interactions of the radiopharmaceuticals. Other conditions that may vary and affect the accuracy of the comparison include timing differences between injection and scanning of the PET and SPECT scans, whether a patient was under fasting before the imaging procedures, took a specific medication, etc.

To account for some of these differences, in another instance, the dose estimator 708 estimates a dosimetry value for a metastasize based on Ds=Rsp*Dp*(At/Ad)*F, where F represents a factor related to a physiological absorption relation between components of the administered SPECT and PET-based radiopharmaceuticals. In one instance, the factor F is empirically known for a pair of SPECT and PET-based radiopharmaceuticals.

In some instances, the factor F will be known more accurately for different types of disease tissue and healthy organs. For example, in a specific theranostic procedure, the factor F may be somewhat larger than 1.0 for the liver and kidneys, but at the same time somewhat lower than 1.0 for cancerous lesions. In general, a typical value of the factor F is between 0.5 to 2.0. However, higher and/or lower values are contemplated herein.

In another instance, the forward projection is simplified using a rotation convolution method. If all the detectors are the same and the pixel pitch is the same as the voxel pitch, the detector and geometric sensitivity can be modeled for a voxel at a distance from ½ voxel to y voxels and shifts −x to +x (j sub voxel shifts). This will generate 2D kernels $K_{ij}$ for a shift i and a distance j. For each view, the activity and attenuation map will be rotated and shifted relative to the detector to derive the relative orientation of the patient and detector in the given view.

Each slice (voxels at a distance j on a plane parallel to the detector) will be convoluted with its appropriate kernel $K_{ij}$. The convoluted slice will be corrected for attenuation by determining the attenuation of each voxel in the slice. The attenuation corrected convoluted slice will be summed to the simulated projection. The simulated projection will then be multiplied by the view duration u. Alternatively, the convolution may be applied after the attenuation correction.

In another instance, the forward projection may be performed employing a Monte Carlo simulation that uses the PET image date as an activity distribution, the attenuation map as an attenuation media, and the geometry and composition of the detector to determine the detection rate.

Figure 8:
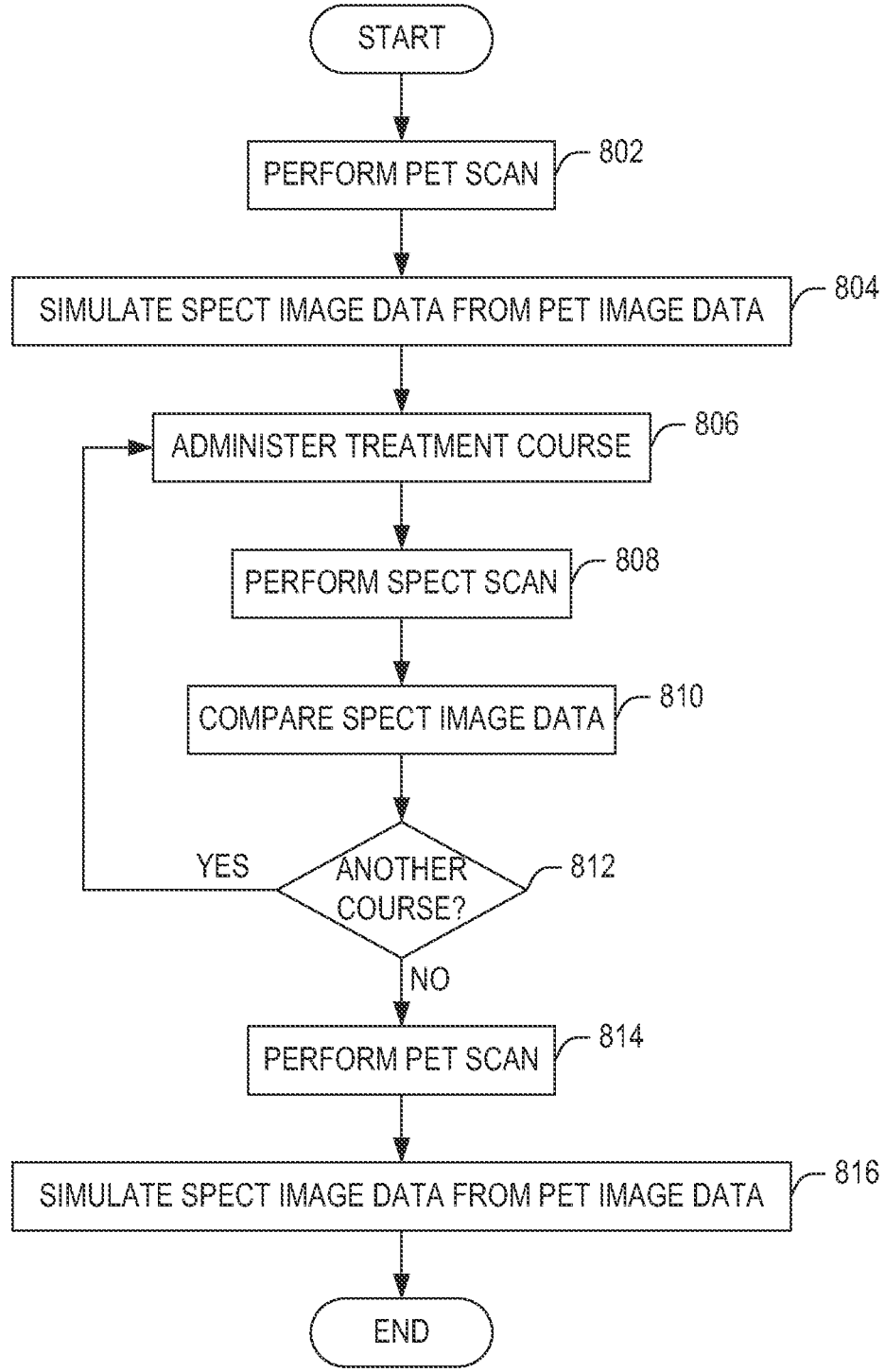
FIG. 8 illustrates a non-limiting example of a flow chart for a computer-implemented method, in accordance with an embodiment(s) herein.

FIG. 8 illustrates a non-limiting example of a flow chart for a computer-implemented method. It is to be appreciated that the ordering of the acts in the method is not limiting. As such, other orderings are contemplated herein. In addition, one or more acts may be omitted, and/or one or more additional acts may be included.

At 802, a PET scan is performed, generating PET image data, as described herein and/or otherwise. At 804, simulated SPECT image data is generated based on the PET image data, as described herein and/or otherwise. At 806, a treatment course is administered, as described herein and/or otherwise. At 808, one or more SPECT scans is performed, generating SPECT image data, as described herein and/or otherwise. At 810, the simulated SPECT image data and the SPECT image data is compared, as described herein and/or otherwise.

At 812, it is determined whether another treatment course is to be administered (based on the treatment regimen or an adjusted treatment regimen) or not (e.g., where the treatment regimen has been completed or terminated, as described herein and/or otherwise). Where another treatment course is to be administered, acts 806, 808, 810 and 812 are repeated. Where the treatment regimen has ceased, at 814 another PET scan is performed, generating PET image data, as described herein and/or otherwise.

At 816, simulated SPECT image data is generated based on the PET image data, as described herein and/or otherwise. At 810, the SPECT image data and/or the PET image data acquired for the treatment regime can be compared, as described herein and/or otherwise. Optionally, PET image data can be acquired between treatment courses. Such PET image data can be compared, including with the PET image data generated at acts 802 and/or 814, and/or utilized to simulated SPECT image data, with the SPECT image data compared, including with the SPECT image data generated at acts 804, 808 and/or 816.

Figure 9:
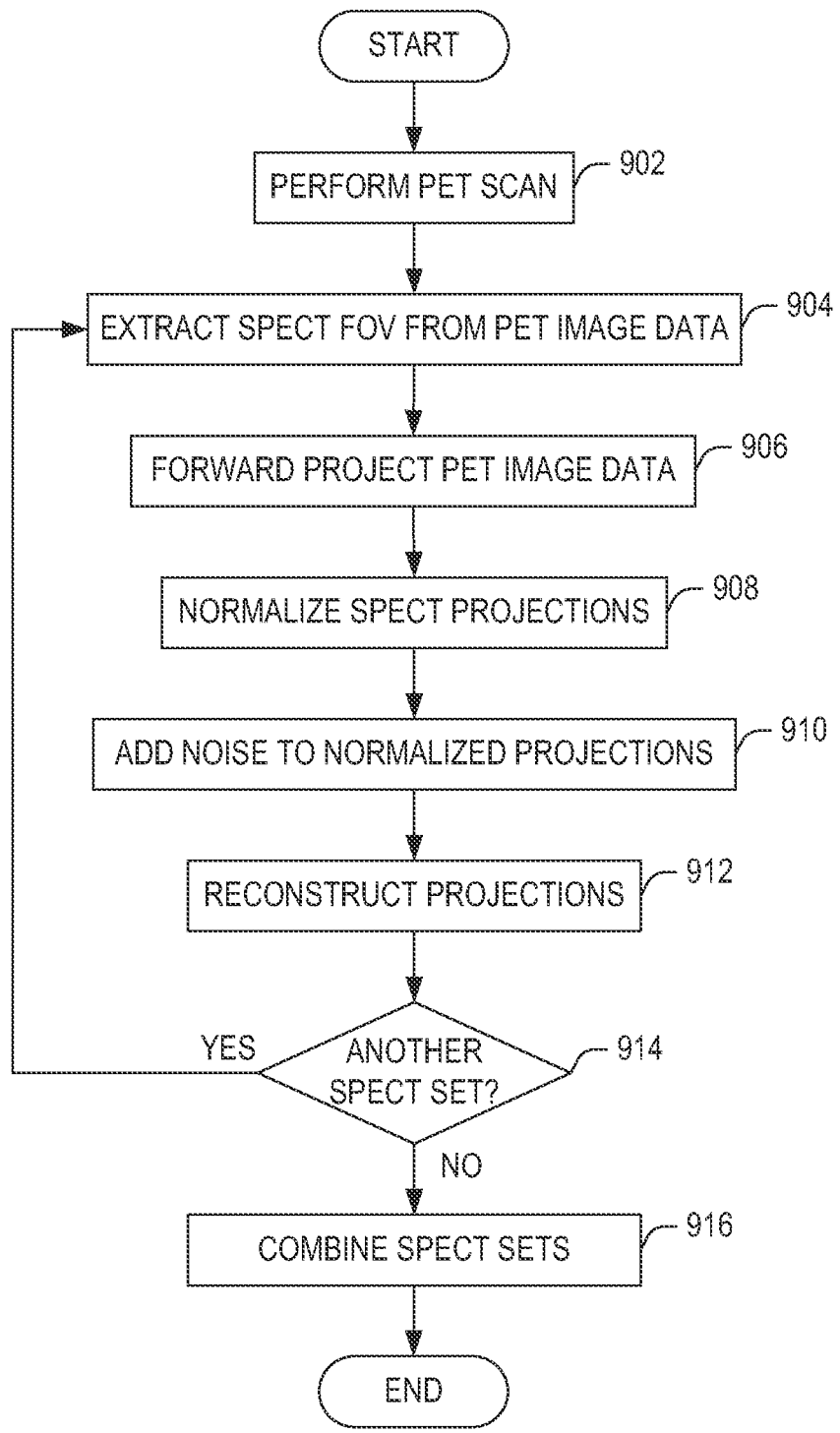
FIG. 9 illustrates a non-limiting example of a flow chart for another computer-implemented method, in accordance with an embodiment(s) herein.

FIG. 9 illustrates a non-limiting example of a flow chart for a computer-implemented method. It is to be appreciated that the ordering of the acts in the method is not limiting. As such, other orderings are contemplated herein. In addition, one or more acts may be omitted, and/or one or more additional acts may be included.

At 902, a PET scan is performed, generating PET image data, as described herein and/or otherwise. At 904, a SPECT FOV is extracted from the PET image data, as described herein and/or otherwise. At 906, the PET image data is forward projected into SPECT projections based on SPECT imaging system and scan parameters, as described herein and/or otherwise.

At 908, the SPECT projections are normalized, as described herein and/or otherwise. At 910, SPECT noise is added to the normalized SPECT projections, as described herein and/or otherwise. At 912, the normalized SPECT projections with noise is reconstructed, generating the simulated SPECT image data, as described herein and/or otherwise. At 914, it is determined whether another simulated SPECT image data set will be generated, as described herein and/or otherwise.

Where another simulated SPECT image data will be generated, acts 904-914 are repeated for a different FOV, as described herein and/or otherwise. Where other simulated SPECT image data will not be generated, at 916, the simulated SPECT image data for the different FOVs are combined into a single set of SPECT image data, as described herein and/or otherwise.

Figure 10:
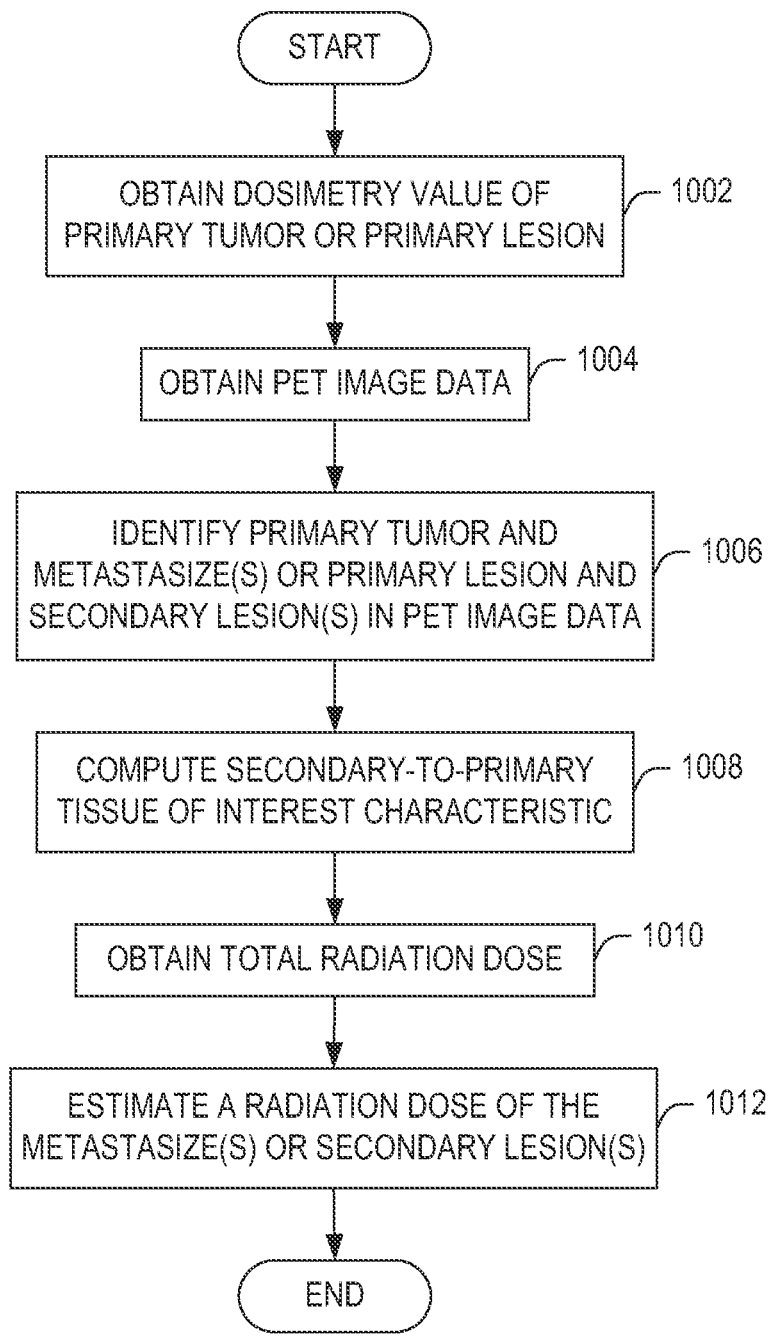
FIG. 10 illustrates a non-limiting example of a flow chart for still another computer-implemented method, in accordance with an embodiment(s) herein.

FIG. 10 illustrates a non-limiting example of a flow chart for a computer-implemented method. It is to be appreciated that the ordering of the acts in the method is not limiting. As such, other orderings are contemplated herein. In addition, one or more acts may be omitted, and/or one or more additional acts may be included.

At 1002, a dosimetry value result for a primary tumor or primary lesion in SPECT image data is obtained, as described herein and/or otherwise. At 1004, PET image data is obtained, as described herein and/or otherwise. At 1006, a primary tumor and a metastasize(s) or primary lesion and a secondary lesion(s) are identified in the PET image data, as described herein and/or otherwise. At 1008, a secondary-to-primary tissue of interest characteristic is determined between the primary tumor and each metastasize or the primary lesion and each secondary lesion, as described herein and/or otherwise.

At 1010, obtain a total radiation dose of a treatment course, as described herein and/or otherwise. At 1012, estimate a radiation dose absorbed by each metastasize or each secondary lesion based on the dosimetry value, the secondary-to-primary tissue of interest characteristic and the total radiation dose, as described herein and/or otherwise. The estimated radiation dose for one or more of the metastasizes can be visually presented, archived, etc., as described herein and/or otherwise.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

While the invention has been illustrated and described in detail in the drawings and foregoing description, such illustration and description are to be considered illustrative or exemplary and not restrictive; the invention is not limited to the disclosed embodiments. This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A computing system, comprising:
computer readable medium including a positron emission tomography (PET)-to-single photon emission tomography (SPECT) module with instructions for generating simulated SPECT image data based on first PET image data, wherein the first PET image data is acquired prior to a treatment course of a treatment regimen with a SPECT-based treatment/imaging radiopharmaceutical; and
a processor configured to obtain the first PET image data, system parameters of a SPECT-CT imaging system utilized to generate corresponding SPECT image data for the treatment regimen and scan parameters utilized by the SPECT-CT imaging system to acquire the corresponding SPECT image data, and execute the instructions to forward project the PET image data into SPECT projections based on the system parameters and the scan parameters and reconstruct the SPECT projections to generate the simulated SPECT data.

2. The computing system of claim 1, wherein the processor is further configured to:
normalize the SPECT projections to generate normalized SPECT projections;
add noise to the normalized SPECT projections to generate normalized SPECT projections with noise; and
reconstruct the normalized SPECT projections with noise to generate the simulated SPECT image data.

3. The computing system of claim 2, wherein the processor is further configured to:
extract a second SPECT FOV from the PET image data;
forward project the PET image into second SPECT projections;
normalize the second SPECT projections to generate second normalized SPECT projections;
add noise to the second normalized SPECT projections to generate second normalized SPECT projections with noise;
reconstruct the second normalized SPECT projections with noise to generate second simulated SPECT image data; and
combine the simulated SPECT image data and the second simulated SPECT image data to create a single set of simulated SPECT image data.

4. The computing system of claim 1, wherein the processor is further configured to:
obtain first SPECT image data acquired after the treatment course of the treatment regimen; and
compare the simulated SPECT image data and the first SPECT image data.

5. The computing system of claim 4, wherein the processor is further configured to:
obtain second SPECT image data acquired after a second treatment course of the treatment regimen; and
compare at least one of the simulated SPECT image data or the first SPECT image data with the second SPECT image data.

6. The computing system of claim 1, wherein the processor is further configured to:
obtain second PET image data acquired after the treatment regimen;
generate second simulated SPECT image data based on the second PET image data and the system and scan parameters; and
compare the simulated SPECT image data and the second simulated SPECT image data.

7. The computing system of claim 1, wherein the processor is further configured to:
obtain second PET image data acquired after the treatment regimen; and
compare the PET image data and the second PET image data.

8. The computing system of claim 1, wherein the processor is further configured to:

obtain second PET image data acquired after the treatment regimen;
generate second simulated SPECT image data based on the second PET image data and the system and scan parameters; and
compare the simulated SPECT image data and the second simulated SPECT image data.

9. The computing system of claim 1, wherein the processor is further configured to:
obtain a dosimetry value of primary tissue of interest or healthy tissue in SPECT image data acquired after the treatment course of the treatment regimen;
identify the primary tissue of interest and secondary tissue of interest in the PET image data;
determine a value of a secondary-to-primary tissue of interest characteristic;
obtain a total radiation dose; and
estimate a radiation dose of the secondary tissue of interest based on the dosimetry value, the value of the secondary-to-primary tissue of interest characteristic and the total radiation dose.

10. The computing system of claim 9, wherein the processor further estimates the radiation dose based on a factor indicative of an imaging relationship between SPECT and PET imaging.

11. A computer-implemented method, comprising:
obtaining first PET image data that was acquired prior to a treatment course of a treatment regimen with a SPECT-based treatment/imaging radiopharmaceutical;
obtaining system parameters of a SPECT-CT imaging system utilized to acquire SPECT image data for the treatment regimen and scan parameters utilized by the SPECT-CT imaging system to acquire the SPECT image data; and
generating a simulated SPECT image data by forward projecting the PET image data into SPECT projections based on the system parameters and the scan parameters and reconstructing the SPECT projections.

12. The computer-implemented method of claim 11, further comprising:
normalizing the SPECT projections to generate normalized SPECT projections;
adding noise to the normalized SPECT projections to generate normalized SPECT projections with noise; and
reconstructing the normalized SPECT projections with noise to generate the simulated SPECT image data.

13. The computer-implemented method of claim 11, further comprising:
extracting a second SPECT FOV from the PET image data;
forward projecting the PET image into second SPECT projections;
normalizing the second SPECT projections to generate second normalized SPECT projections;
adding noise to the second normalized SPECT projections to generate second normalized SPECT projections with noise;
reconstructing the second normalized SPECT projections with noise to generate second simulated SPECT image data; and
combining the simulated SPECT image data and the second simulated SPECT image data to create a single set of SPECT image data.

14. The computer-implemented method of claim 11, further comprising:

obtaining second PET image data acquired after the treatment regimen;
generating second simulated SPECT image data based on the second PET image data and the system and scan parameters; and
comparing the simulated SPECT image data and the second simulated SPECT image.

15. The computer-implemented method of claim 11, further comprising:
obtaining a dosimetry value of primary tissue of interest or healthy tissue in SPECT image data acquired after the treatment course of the treatment regimen;
identifying the primary tissue of interest and secondary tissue of interest in the PET image data;
determining a value of a secondary-to-primary tissue of interest characteristic;
obtaining a total radiation dose; and
estimating a radiation dose of the secondary tissue of interest based on the dosimetry value, the value of the secondary-to-primary tissue of interest characteristic and the total radiation dose.

16. A computer readable storage medium encoded with computer executable instructions which when executed by a processor cause the processor to:
obtain first PET image data that was acquired prior to a treatment course of a treatment regimen with a SPECT-based treatment/imaging radiopharmaceutical;
obtain system parameters of a SPECT-CT imaging system to be utilized to acquire SPECT image data and scan parameters utilized by the SPECT-CT imaging system to acquire the SPECT image data; and
generate a-simulated SPECT image data by forward projecting the PET image data into SPECT projections based on; the system parameters and the scan parameters and reconstructing the SPECT projections.

17. The computer readable storage medium of claim 16, wherein the computer executable instructions further cause the processor to:
normalize the SPECT projections to generate normalized SPECT projections;
add noise to the normalized SPECT projections to generate normalized SPECT projections with noise; and
reconstruct the normalized SPECT projections with noise to generate the simulated SPECT image data.

18. The computer readable storage medium of claim 17, wherein the computer executable instructions further cause the processor to:
extract a second SPECT FOV from the PET image data;
forward project the PET image into second SPECT projections;
normalize the second SPECT projections to generate second normalized SPECT projections;
add noise to the second normalized SPECT projections to generate second normalized SPECT projections with noise;
reconstruct the second normalized SPECT projections with noise to generate second simulated SPECT image data; and
combine the simulated SPECT image data and the second simulated SPECT image data to create a single set of SPECT image data.

19. The computer readable storage medium of claim 16, wherein the computer executable instructions further cause the processor to:
obtain second PET image data acquired after the treatment regimen;

generate second simulated SPECT image data based on the second PET image data and the system and scan parameters; and compare the simulated SPECT image data and the second simulated SPECT image.

20. The computer readable storage medium of claim 16, wherein the computer executable instructions further cause the processor to:

obtain a dosimetry value of primary tissue of interest or healthy tissue in SPECT image data acquired after the treatment course of the treatment regimen;

identify the primary tissue of interest and secondary tissue of interest in the PET image data;

determine a value of a secondary-to-primary tissue of interest characteristic;

obtain a total radiation dose; and estimate a radiation dose of the secondary tissue of interest based on the dosimetry value, the value of the secondary-to-primary tissue of interest characteristic and the total radiation dose.

* * * * *